(12) United States Patent
Kadir et al.

(10) Patent No.: US 8,948,481 B2
(45) Date of Patent: *Feb. 3, 2015

(54) SIGNAL PROCESSING METHOD AND APPARATUS

(75) Inventors: Timor Kadir, Oxford (GB); John Michael Brady, Oxford (GB)

(73) Assignee: Mirada Medical Ltd., Oxford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,899

(22) Filed: Sep. 14, 2012

(65) Prior Publication Data

US 2013/0011039 A1 Jan. 10, 2013

Related U.S. Application Data

(63) Continuation of application No. 12/705,831, filed on Feb. 15, 2010, now Pat. No. 8,275,183, which is a continuation of application No. PCT/GB2005/004317, filed on Nov. 9, 2005.

(30) Foreign Application Priority Data

Nov. 9, 2004 (GB) .................................... 0424737

(51) Int. Cl.
*G06K 9/00* (2006.01)
*G06K 9/62* (2006.01)
*G06F 17/18* (2006.01)

(52) U.S. Cl.
CPC .............. *G06K 9/6217* (2013.01); *G06F 17/18* (2013.01)
USPC ............................................. 382/128; 378/4

(58) Field of Classification Search
USPC ................. 382/100, 128, 129, 130, 131, 132; 128/922; 378/4–27
See application file for complete search history.

(56) References Cited

U.S. PATENT DOCUMENTS

| | | | |
|---|---|---|---|
| 3,754,098 A | 8/1973 | Abramson et al. | |
| 6,169,817 B1 * | 1/2001 | Parker et al. | 382/131 |
| 6,721,664 B1 | 4/2004 | Terwilliger | |
| 6,748,098 B1 * | 6/2004 | Rosenfeld | 382/131 |
| 6,993,441 B1 | 1/2006 | Tsyrganovich | |
| 7,076,091 B2 * | 7/2006 | Rosenfeld | 382/131 |
| 7,426,290 B1 * | 9/2008 | Khan et al. | 382/132 |
| 2002/0055913 A1 | 5/2002 | Rajan | |
| 2007/0036418 A1 * | 2/2007 | Pan et al. | 382/131 |
| 2008/0039960 A1 * | 2/2008 | Kadir et al. | 700/73 |
| 2010/0278425 A1 * | 11/2010 | Takemoto et al. | 382/173 |
| 2011/0110567 A1 * | 5/2011 | Jiang | 382/128 |

* cited by examiner

*Primary Examiner* — Anand Bhatnagar
(74) *Attorney, Agent, or Firm* — Novak Druce Connolly Bove + Quigg LP

(57) ABSTRACT

A signal processing method that includes inputting sample values of a signal and considering the signal to have a plurality of portions. For each portion, a predetermined function is fitted to the sample values of that portion of the signal by calculating values of coefficients for that predetermined function. At least one statistical information function is evaluated for the signal to determine statistical information about the signal and the calculated coefficient values are used so that the form of the statistical information function has been determined for the predetermined function used to fit the signal portion and further includes using the statistical information obtained about the signal to process the signal.

15 Claims, 14 Drawing Sheets

SIGNAL PROCESSING METHOD AND APPARATUS

CROSS-REFERENCE TO RELATED APPLICATIONS

The present application is a continuation application of U.S. application Ser. No. 12/705,831, filed on Feb. 15, 2010, now issued as U.S. Pat. No. 8,275,183, which is a continuation patent application of International Application No. PCT/GB2005/004317, filed 9 Nov. 2005 which was published in English pursuant to Article 21(2) of the Patent Cooperation Treaty and which claims priority to GB Application No. 0424737.5 filed 9 Nov. 2004. Said applications are expressly incorporated by reference in their entirety.

FIELD

The present invention relates to a signal processing method in which statistical information about a signal is determined, and also provides a computer program and signal processing apparatus for performing signal processing in which statistical information about a signal is determined.

BACKGROUND

In many fields, for example speech signal processing, artificial intelligence, telecommunications and medical imaging, it is desired to obtain estimates of statistical information such as probability distributions from discrete, sampled signals, such as digitised speech, still images or video. Examples of probability distributions are probability density functions (PDFs) and cumulative distribution functions (CDFs). For a one-dimensional signal $y=f(x)$, the PDF gives the density of samples of that signal having particular values. As an example, to assist understanding of the background of the present invention, for the signal $y=\sin(x)$, the PDF can be calculated analytically and is plotted in FIG. 1. FIG. 1 also plots the CDF, which is obtained by integrating the PDF and gives the probability that the signal has a value less than a particular y value. For example, for $y=1$, the CDF is 1 because the function $\sin(x)$ is always less than or equal to 1. For $y=0$, the CDF is 0.5 because there is a probability of 0.5 that a sample of the signal will be less than zero.

In the case of real-world signals which are sampled and whose form is not known in an analytic representation, then a conventional method for PDF estimation is known as histogramming. The possible values of the signal are divided into a number of ranges known as bins. Then for each bin a count is kept of how many times the available samples of the signal fall within the range of that bin. A histogram can then be plotted of the number of times a sample falls within the range of a particular bin divided by the total number of samples. FIG. 2 shows an example of such a histogram for the signal $y=\sin(x)$. In this case, the signal values y, which must lie between −1 and +1, are divided into 64 bins, each with a bin-width of 1/32. It can be seen that this histogram gives an approximation to the PDF. The continuous line representing the PDF is superimposed on FIG. 2. The PDF has been normalized by a weighting factor by assuming that the point evaluation of the PDF is constant across the width. The bin values of a histogram represent a probability that the signal lies between two value points, the upper and lower bin boundaries, and therefore must be less than 1. The histogram is a piecewise constant function. On the other hand, a PDF is a continuous function and at a point represents the density of values which that function (signal) passes through (and hence can be greater than 1). In the limit of zero bin-width, the histogram equals the PDF.

Probability distribution estimation techniques generally fall into one of three categories: parametric, non-parametric and semi-parametric. Parametric techniques are suitable where a particular form of function can be assumed due to some application specific reasons. For example, Rician and Rayleigh functions are often used in medical signal processing applications e.g. ultrasound imaging. However, such analytical forms for the PDF are generally neither known or not appropriate in most applications.

Probably the simplest and most widely used non-parametric technique is histogramming, as explained above. However, this technique has a number of associated problems, such as the requirement to define in advance the number of bins, and to specify the arbitrary bin boundaries, both of which render the histogram sensitive to slight displacements of the signal, and also the block-like nature of the resulting PDF estimate. Furthermore, the resulting PDF estimates tend to be poor and require large numbers of samples to produce stable estimates (typically the number of samples must considerably exceed the number of bins). Conventionally, it is widely assumed that only the samples available can be used and hence for a given portion of the signal, the number of samples is fixed. For example, if it was desired to estimate the PDF of the part of an image corresponding to a face, and this was represented by 50 pixels, then conventional methods would use only those 50 pixels. A number of techniques to repair these problems are available, such as Parzen windowing in which the PDF is approximated as the superposition of kernels placed at domain positions corresponding to the (co-domain) value of each sample. However, they do not work well in general. For example, Parzen windowing avoids arbitrary bin assignments and leads to smoother PDFs, however, a suitable kernel shape and size must be chosen. Conventionally this choice has been somewhat arbitrary and non-systematic, so does not give stable or universally predictable results.

Semi-parametric techniques, such as Guassian mixture models, offer a compromise between the parametric and non-parametric approaches, whereby the superposition of a number of parametric densities are used to approximate the underlying density.

Thus the current techniques suffer from the problem that the PDF can only be estimated from large parts of the signal (to obtain enough samples), and the resulting PDF estimates often exhibit poor stability (if the signal is shifted, the PDF estimate changes), poor accuracy, and poor resolution (limited to the bin width); conventional techniques also require the careful setting of several parameters, such as bin-widths or smoothing kernel shapes and sizes. However, according to the invention, it has been realized that some of these limitations and problems arise from the fact that these techniques do not use all of the information in the sampled signal.

The Whittaker-Shannon sampling theory states that a band-limited continuous signal, $y(t)$ can be uniquely reconstructed from its samples (assumed to be periodic) as long as the sampling rate $F_s$ satisfies the relationship, $F_s \geq 2B$ where B is the highest frequency present in $y(t)$. When $F_s=2B$ the signal is said to be critically sampled and the respective sampling frequency referred to as the Nyquist rate. Since real-world signals have infinite bandwidth (in theory at least) they do not have an upper limit on their frequency. Therefore, they must be low-pass filtered prior to sampling in order to avoid corruption of the reconstruction known as aliasing. In such a case, the reconstruction is of the band-limited signal, its bandwidth chosen appropriately for the application. For example, since speech can generally be understood with ease even if the signal is cut-off at 4 kHz, telephone quality speech can be sampled at a rate of 8 kHz. Similarly, for a signal representing an image, filtering (in this case spatial filtering) is performed by the optics, such as the camera lens and aperture.

Essentially, band-limited signals of practical interest, such as speech or images, can be reconstructed exactly given three pieces of information: (1) the samples; (2) their order; and (3) the sampling pre-filter characteristics.

Often, conventional techniques for PDF estimation, such as histogramming, Parzen windowing and Gaussian mixture models, assume that the samples are independent and identically distributed (IID) samples from some continuous underlying PDF which is to be estimated. However, this assumption is not true for band-limited signals sampled at least the Nyquist rate. Essentially these methods just use the first piece of information, i.e. the sample values. However, this disregards information. For example, given a sample value of a signal at one point, the next consecutive sample cannot just take an arbitrary value selected from the probability distribution because of, for example, constraints such as the frequency band limitation. This loss of information because of the IID assumption leads to poor system performance in which, for example, the number of samples determines the quality of the final estimate.

SUMMARY

One simple approach to generating PDFs of arbitrary stability and accuracy, according to one aspect of the invention, is to generate extra samples synthetically, because sampling theory teaches that the band-limited signal can be reconstructed at any point. This corresponds to over sampling the signal beyond the Nyquist rate. As many extra samples as desired can be generated, and these extra samples can be used to populate a histogram in the conventional manner to produce a PDF estimate of arbitrary stability and accuracy, by forming a histogram with an arbitrarily small bin size.

However, there are significant practical challenges that may limit the utility of such an approach. In many cases it is computationally inefficient to generate a sufficiently large number of samples and process them; in some cases such a process would be intractable. The filter function is rarely a simple analytic function, particularly for the case of signals representing an image, so the interpolation must proceed with a reconstruction filter specified numerically, which can be quite an inefficient process in itself. Consequently, another aspect of the invention has been devised using a different approach to address these issues.

It is desirable to alleviate, at least partially, the problems of conventional techniques. Accordingly, one aspect of the present invention provides a signal processing method comprising: inputting sample values of a signal; considering the signal to comprise a plurality of portions; for each portion: fitting a predetermined function to the sample values of that portion of the signal by calculating values of coefficients for that predetermined function; and evaluating at least one statistical information function for the signal to determine statistical information about the signal, using the calculated coefficient values, wherein the form of the at least one statistical information function has been determined for the predetermined function used to fit the signal portion; and further comprising using the statistical information obtained about the signal to process the signal.

Another aspect of the invention provides a computer program comprising computer-executable code that when executed on a computer system causes the computer system to perform the method as defined above. The invention also provides a computer-readable medium storing a computer program of the invention.

A further aspect of the invention provides a signal processing apparatus comprising: an input that receives sample values of a signal; an analysis module for considering portions of the signal; wherein, for each portion of the signal, the analysis module: calculates values of coefficients for fitting a predetermined function to the sample values of that portion of the signal; and evaluates at least one statistical information function for the signal to determine statistical information about a signal, using the calculated coefficient values, wherein the form of the at least one statistical information function has been determined for the predetermined function used to fit the signal portion; and further comprising a processing module that uses the statistical information obtained about the signal by the analysis module to process the signal.

The invention is advantageous because it provides a non-parametric technique that enables the probability distribution to be evaluated with arbitrary resolution, independent of the number of sample points. Furthermore, no arbitrary bin widths or smoothing kernel parameters have to be set. This technique is in general more accurate and more efficient to implement than sampling, such as over-sampling and then histogramming. In fact, its accuracy is dependent only on the accuracy of the functional representation of each portion, not the number of samples, nor the number of bins.

Another aspect of the invention provides a signal processing method comprising: inputting sample values of a signal; up-sampling the signal by generating additional sample values of the signal using interpolation to produce an up-sampled version of the sampled signal; calculating statistical information about the signal using the up-sampled version of the signal; and further comprising using the statistical information obtained about the signal to process the signal. An apparatus, computer program and computer-readable medium corresponding to the method of this aspect of the invention are also envisaged.

BRIEF DESCRIPTION OF DRAWINGS

Embodiments of the invention will now be described by way of example only, with reference to the accompanying drawings in which.

DETAILED DESCRIPTION

Figure 1:
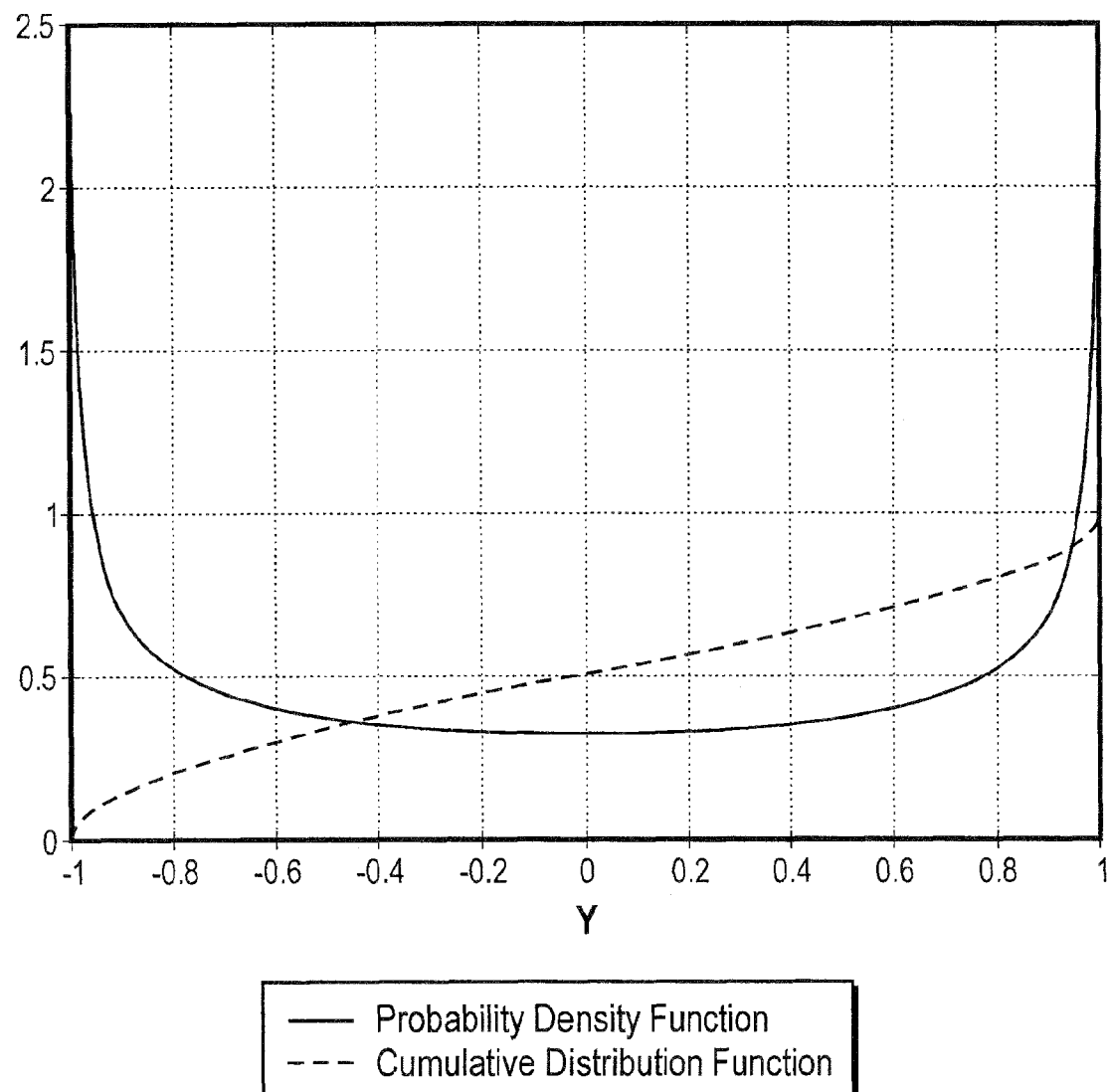
FIG. 1 shows plots of the Probability Density Function and Cumulative Distribution Function for a sine function.
Figure 2:
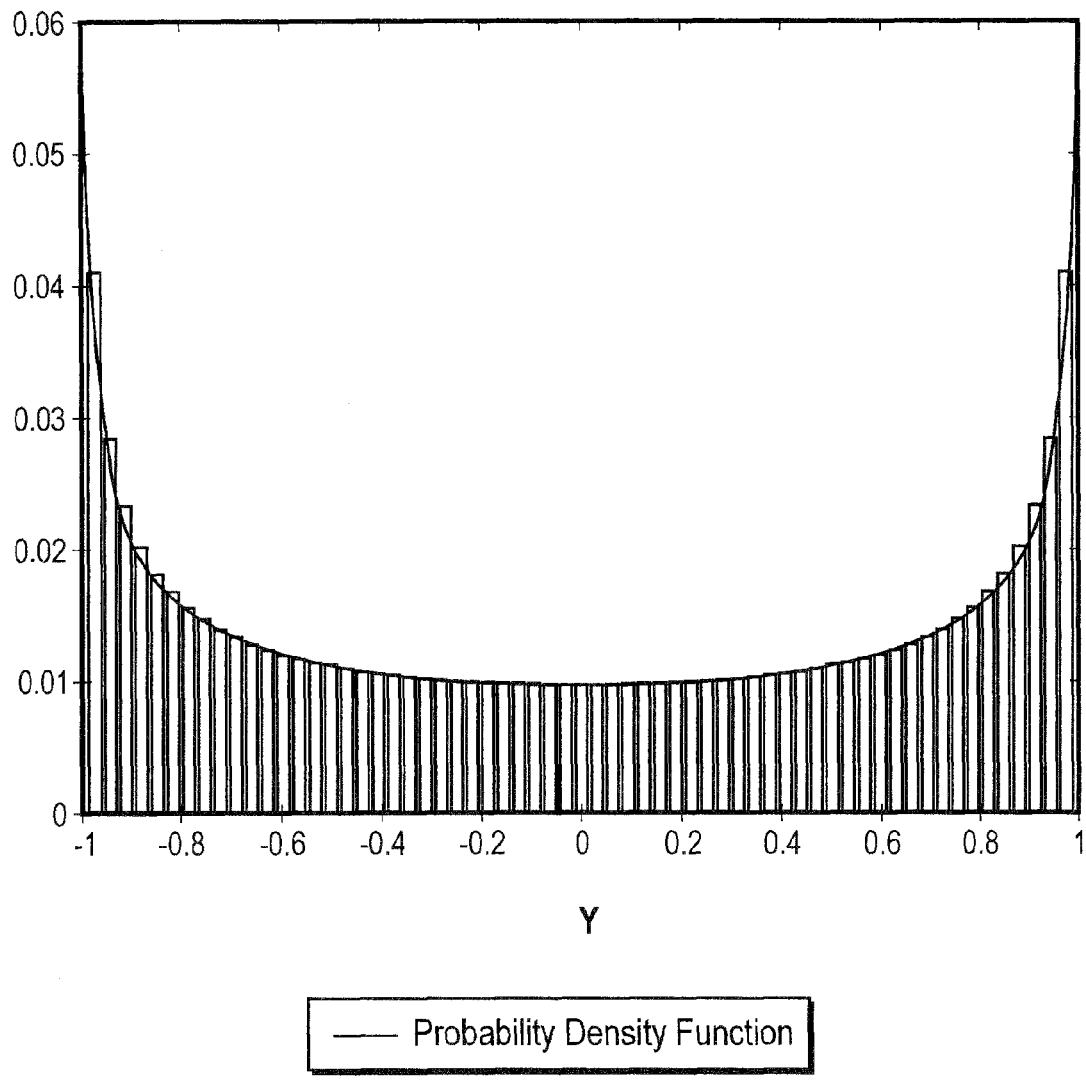
FIG. 2 is a 64 bin probability histogram derived from the analytical form of the CDF of the sine function, together with the normalised PDF.

The present invention may be used to determine a variety of statistical information about a signal, such as information about the probability distribution of the signal, the probability density function (PDF), the cumulative distribution function (CDF), the conditional density, the mean, the variance, other moments and the entropy. Embodiments of the invention will be described below principally with reference to the example of calculating the PDF and CDF.

The preferred embodiment of the invention is to represent the signal using an interpolating function from which a PDF estimate can be obtained. Preferably the interpolating function is a piecewise polynomial; splines are a particular type of piecewise polynomial. Furthermore, instead of over-sampling the interpolating function and histogramming as in an alternative technique, an exact PDF and CDF is calculated from each piecewise section using techniques from probability theory.

The method of the preferred embodiment of the invention for calculating the PDF/CDF and histogram consists of three main steps:
1. Calculating the interpolating function coefficients for the signal samples;
2. Calculating the PDF and/or CDF for each piecewise section; and
3. Populating the appropriate histogram bins, using the PDF or CDF for each piecewise section.

The final step 3 is optional and is only necessary if an explicit numerical representation of the PDF is required.

Step 1 comprises considering the signal to comprise a plurality of portions, also referred to as piecewise sections, and using a routine fitting procedure to obtain values of coefficients for the chosen polynomial function to fit each portion in turn. The interpolating function (e.g. piecewise polynomial/spline) can be fitted to the samples using interpolation or approximation procedures. If the samples are considered to be essentially noise-free, then an interpolation fitting procedure can be used; otherwise an approximation fitting procedure can be used. In the interpolation fitting procedure, the interpolating functions pass through the sample points exactly. In the later discussion, the conventional approach is adopted whereby the piecewise spans start at zero and are of unit length. For a 1D signal, such as an audio signal, the portions can comprise sections between consecutive samples separated in time. For a 2D signal, such as an image, the portions comprise spatial areas i.e. pixels.

Regarding step 2, it is first necessary to provide the form of the PDF and/or CDF resulting from the chosen interpolating function, such as a polynomial function. In general this technique can be used for any analytical function, and the invention is not limited to polynomial functions. The principle is to treat the problem of obtaining the PDF as a function of a uniform random variable representing the domain of the signal. Further information can be gleaned from *Probability, Random Variables and Stochastic Processes*, by A Papoulis and S U Pillai, McGraw-Hill 2002. Two known methods are available, using the distribution function or the so-called Transformation formula respectively. The examples below use the latter, but it is understood that this is not crucial for the invention, but merely a specific example. In summary, in order to be able to calculate an analytic function's PDF in closed form, one must be able to solve the function (i.e. invert it to obtain x as a function of y) and calculate its derivative. For the CDF, the resulting PDF must be integrated. In 2D one must be able to calculate a Jacobian, solve the function for one of the variables and perform an extra integration to remove a dummy variable. Polynomial splines, at least at low order and in one or two dimensions, fulfil these requirements. Other functions, such as sinc-based functions, might interpolate the signal more closely, but for this method polynomial splines are mathematically tractable and can be computed rapidly. Details of the form of the PDF and CDF and how they are derived are given below for several specific exemplary cases.

Using the calculated coefficients from step 1, and the form of the PDF and/or CDF derived from the polynomial function, it is possible to evaluate the PDF and/or CDF for each portion of the signal. For step 3, conventional techniques can be employed to populate a histogram by evaluating for each portion the obtained PDF or CDF.

Exemplary Cases—Calculating the Form of the PDF and CDF

Case 1. 1D—Linear.

In this case, each piecewise section is represented as a polynomial of the form, $y(x)=ax+b$, i.e. straight lines defined by coefficients a and b. According to the Transformation formula mentioned above, the PDF ($f_y$) is given by:

$$f_y(y) = \frac{1}{\left|\frac{\partial y}{\partial x}\right|} f_x(x) \quad (1)$$

where $f_x$ is the density of the random variable x, which is assumed to be uniform between the start and end of the piecewise section (by convention for the case of polynomial splines, each section is normalised to start at 0 and end at 1, so the value of the constant is 1). In this case, the derivative is given by $$\frac{\partial y}{\partial x} = a$$

and inverting the functions gives $$x(y) = \frac{y-b}{a}.$$

Substituting these into (1) gives:

$$f_y(y) = \frac{1}{|a|} f_x\left(\frac{y-b}{a}\right) \quad (2)$$

$$= \frac{1}{|a|} b \leq y \leq a+b \quad (3)$$

This has a particularly straightforward and intuitive implementation. The PDF is simply the super-position of piecewise constant sections of magnitude $$\frac{1}{|a|}$$

between domain values b and a+b. This corresponds to adding all values between consecutive points in equal proportion.

The CDF ($F_y$) is given by integrating the PDF with respect to y:

$$F_y(y) = \frac{y}{|a|} b \leq y \leq a+b \quad (4)$$

Case 2. 1D—Quadratic

Each span is represented by a polynomial of the form $y(x)=ax^2+bx+c$. The derivation of the PDF is slightly complicated by the fact that quadratics are in general non-monotonic. Such cases can be handled by either by detecting points at which the curve becomes monotonic and modifying the PDF calculation appropriately or by resampling the spline spans such that each section is strictly monotonic. The latter approach could provide a fast implementation of the PDF estimation stage at the expense of complexity of the spline fitting step. In the following, the former approach is used.

$$y(x) = ax^2 + bx + c \quad (5)$$
$$f_x(x) = 1; 0 \le x \le 1$$

$$\frac{\partial y}{\partial x}(x) = 2ax + b \quad (6)$$

$$x(y) = \frac{-b \pm \sqrt{b^2 - 4a(c-y)}}{2a} \quad (7)$$

Figure 3A:
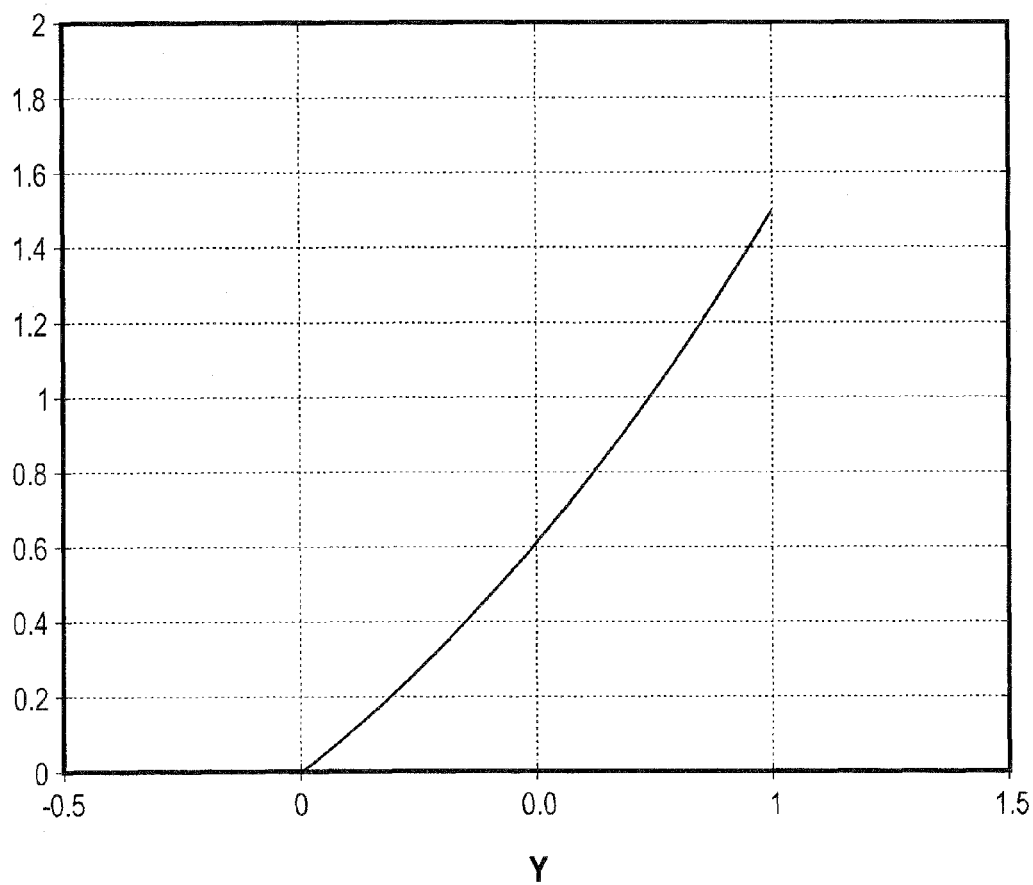
FIG. 3 are illustrative graphs to show that across the span of a spline having a range of x values, a 1D quadratic in x can exibit, as a function of y, (a) single values, (b) multiple values, or (c) a combination of both.
Figure 3B:
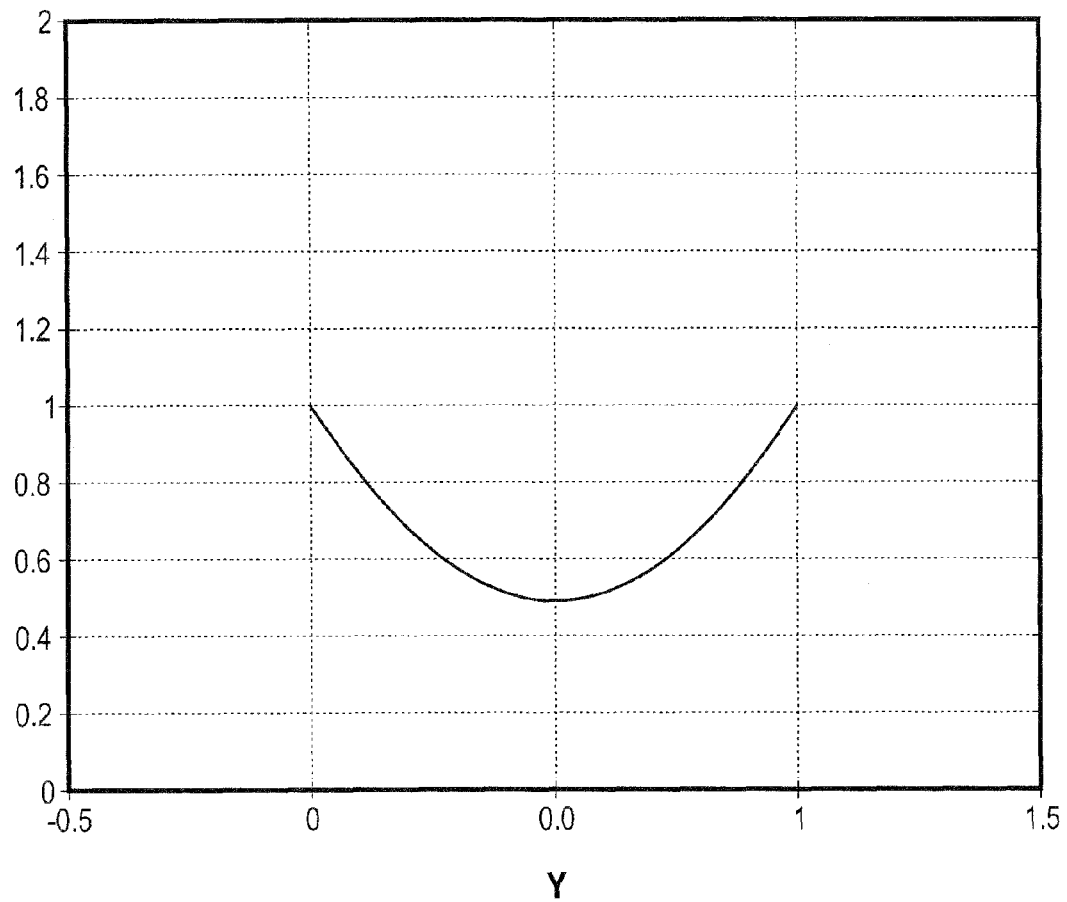
Figure 3C:
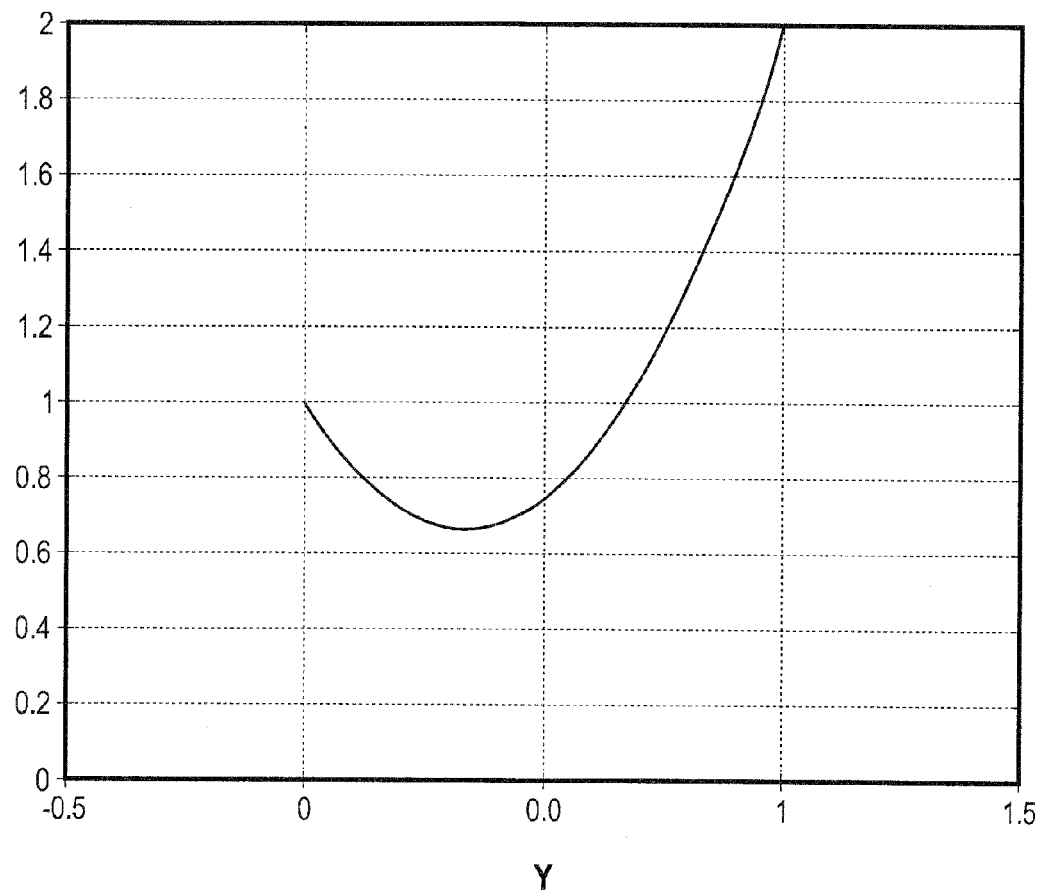

Due to the non-monotonicity of quadratic, the inverse quadratic function will in general be multi-valued, as indicated by the two roots in Equation 7. However, within the spline span, $f_x(x)=0 \le x \le 1$, they may exhibit single values, multiple values or a combination of both as illustrated in FIG. 3. Fortunately, since quadratics are symmetric about the extrema point and we can treat multiple valued sections by considering only one root (hence one side of the extrema) and multiplying the PDF by two in that domain. For each section of the spline the PDF can be calculated as follows:

$$f_y(y) = \frac{1}{|2ax_1 + b|} f_x(x_r) \quad (8)$$

$$= \frac{1}{\left|2a\left(\frac{-b + \sqrt{b^2 - 4a(c-y)}}{2a}\right) + b\right|} \quad 0 \le \frac{-b + \sqrt{b^2 - 4a(c-y)}}{2a} \le 1 \quad (9)$$

$$= \frac{1}{|\sqrt{b^2 - 4ac(c-y)}|} \quad c \le y \le a + b + c \quad (10)$$

The CDF is given by:

$$F_y(y) = \frac{|\sqrt{b^2 - 4a(c-y)}|}{2a} \quad c \le y \le a + b + c \quad (11)$$

Case 3. 2D—Bilinear

The derivation for the two dimensional case requires the introduction of a dummy function and variable which must be integrated out in the final step, denoted $x_2$ in the following:

$$y_1(x_1 x_2) = ax_1 x_2 + bx_1 + cx_2 + d \quad y_2(x_1, x_2) = x_1 \quad (12)$$

$$x_2(y_1, y_2) = \frac{y_1 - by_2 - d}{ay_2 + c} \quad x_1(y_1, y_2) = y_2 \quad (13)$$

$$f_{x_1}(x_1), f_{x_2}(x_2) = 1; \quad 0 \le x_1, x_2 \le 1 \quad (14)$$

The derivative used in the univariate case becomes a Jacobian $|J|$ in the multi-variate case:

$$|J| = \begin{vmatrix} \frac{\partial x_1}{\partial y_1} & \frac{\partial x_1}{\partial y_2} \\ \frac{\partial x_2}{\partial y_2} & \frac{\partial x_2}{\partial y_1} \end{vmatrix} \quad (15)$$

$$= \begin{vmatrix} 0 & 1 \\ \frac{-1}{(ay_2 + c)} & \frac{-b}{(ay_2 + c)} + \frac{(-by_2 - y_1 + d)a}{(ay_2 + c)^2} \end{vmatrix} \quad (16)$$

$$= \frac{1}{ay_2 + c} \quad (17)$$

The joint PDF between $y_1$ and $y_2$ is given by:

$$f_{y1,y2} = f_{x1,x2}\left(y_2, \frac{y_1 - by_2 - d}{ay_2 + c}\right)|J| \quad (18)$$

$$= \frac{1}{ay_2 + c} \quad 0 \le y_2 \le 1; 0 \le \frac{y_1 - by_2 - d}{ay_2 + c} \le 1 \quad (19)$$

$$= \frac{1}{ay_2 + c} \quad \begin{array}{l} 0 \le y_2 \le 1; \\ by_2 + d \le y_1 \le ay_2 + by_2 + c + d \end{array} \quad (20)$$

The inequalities in Equation 20 define the range over which the dummy variable, $y_2$, should be integrated out. Graphically, the integration must be carried over the range $y_2$ defined by the lines:

$$y_2 = 0, \quad y_2 = 1, \quad y_2 = \frac{y_1 - d}{b}, \quad y_2 = \frac{y_1 - c - d}{a + b}. \quad (21)$$

Figure 4:
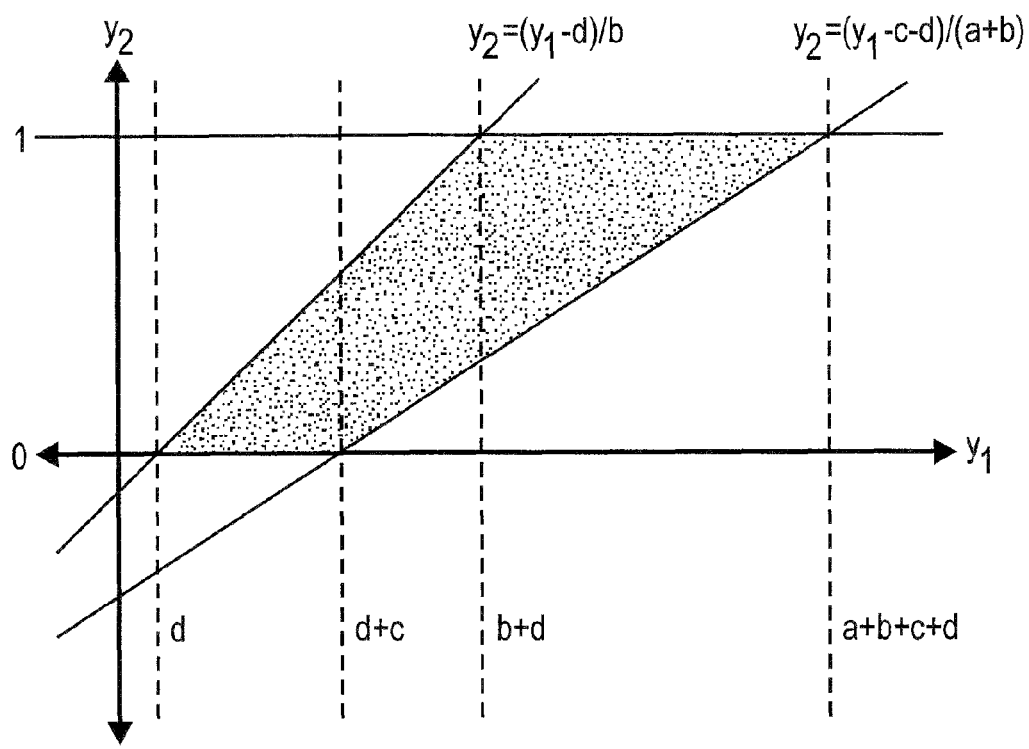
FIG. 4 show graphically the integration ranges for the 2D bilinear spline case.

For example, FIG. 4 shows the integration range for the case where $\{a, b, c, d\} > 0$ and $b > c$. In this particular case, the integration proceeds over three ranges:

$$f_{y_1}(y_1) = \begin{cases} \int_0^{\frac{y_1 - d}{b}} \frac{1}{ay_2 + c} dy_2: & d \le y_1 < d + c \\ \int_{\frac{y_1 - c - d}{a + b}}^{\frac{y_1 - d}{b}} \frac{1}{ay_2 + c} dy_2: & d + c \le y_1 < b + d \\ \int_{\frac{y_1 - c - d}{a + b}}^{1} \frac{1}{ay_2 + c} dy_2: & d + b \le y_1 \le a + b + c + d \end{cases} \quad (22)$$

$$= \begin{cases} \frac{1}{a}\left(\ln\left(\frac{ay_1 - d + cb}{b}\right) - \ln(c)\right): & d \le y_1 < d + c \\ \frac{1}{a}\left(\ln\left(\frac{ay_1 - d + cb}{b}\right) - \ln\left(\frac{ay_1 - ad + cb}{a + b}\right)\right): & d + c \le y_1 < b + d \\ \frac{1}{a}\left(\ln(a + c) - \ln\left(\frac{ay_1 - ad + cb}{a + b}\right)\right): & d + b \le y_1 \le a + b + c + d \end{cases} \quad (23)$$

Note, that the specific integrals are determined by the values of the coefficients, or more precisely, the intersections of the lines defined by Equation 21. This complicates the implementation since there are many possible cases that can occur. To determine how many cases occurs we denote the $y_2$ positions of the intersection points of the four lines as integers:

$$1: y_2 = 0 \cap y_2 = \frac{y_1 - d}{b} \quad (24)$$

$$2: y_2 = 1 \cap y_2 = \frac{y_1 - d}{b}$$

$$3: y_2 = 0 \cap y_2 = \frac{y_1 - c - d}{a + b}$$

$$4: y_2 = 1 \cap y_2 = \frac{y_1 - c - d}{a + b}$$

Figure 5:
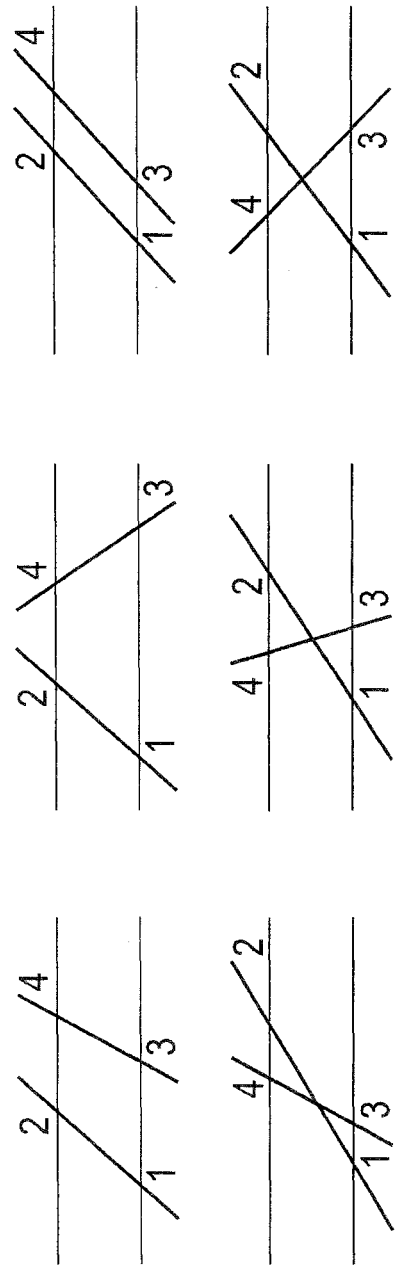
FIG. 5 illustrates the six basic configurations given by Equations (21) that determine the integration ranges.

The ordering of these positions describes unique configurations in the graphs and hence determines the ranges of the integration; see FIG. 5.

While there are 24 configurations in total, these can be grouped into 6 basic arrangements as shown in FIG. 5 where each graph corresponds to 4 of the 24 cases. For example, orderings {2 1 4 3}, {3 4 1 2} and {4 3 2 1} all result in configurations similar to that of {1 2 3 4} shown in the top left of FIG. 5. The reason is that for all of these cases the $y_2=0$ and $y_2=1$ intersections of the $$\frac{y_1 - c - d}{a + b}$$

line occur together and separately from those of $$\frac{y_1 - d}{b}.$$

Such groupings can be used to simplify the implementation of the invention.

Case 4. Joint PDFs

Estimation of joint PDFs can proceed in a manner similar to that of the 2D case described in the previous section. However, instead of the dummy variable and function one uses the piecewise polynomials of the second signal and does not perform the final integration step. For clarity of presentation the joint case is illustrated using the 1D linear case from which the 2D bilinear and quadratic cases follow.

$$y_1(x_1, x_2) = ax_1b \quad y_2(x_1, x_2) = cx_2 + d \quad (25)$$

$$x_1(y_1, y_2) = \frac{y_1 - b}{a} \quad x_2(y_1, y_2) = \frac{y_2 - d}{c} \quad (26)$$

$$f_{x_1}(x_1), f_{x_2}(x_2) = 1; \quad 0 \le x_1, x_2 \le 1 \quad (27)$$

The Jacobian in this case is:

$$|J| = \begin{vmatrix} \frac{1}{a} & 0 \\ 0 & \frac{1}{c} \end{vmatrix} = \frac{1}{ac} \quad (28)$$

The joint PDF between $y_1$ and $y_2$ is given by:

$$f_{y1,y2} = f_{x1,x2}\left(\frac{y_1 - b}{a}, \frac{y_2 - d}{c}\right)|J| \quad (29)$$

$$= \frac{1}{ac} \quad 0 \le \frac{y_1 - b}{a} \le 1; 0 \le \frac{y_2 - d}{c} \le 1 \quad (30)$$

$$= \frac{1}{ac} \quad b \le \ \le y_1 \le a + b; d \le y_2 \le c + d \quad (31)$$

In some cases the variable of one function is a transformation of another. For example, in the maximisation of Mutual Information (MI) image registration algorithm one signal, typically an image, is assumed to be some unknown geometric transformation of the another. In this 1D example this corresponds to a shift such that $x_2=x_1+\delta x$. Such a relationship could be used to simplify the implementation of the joint PDF calculation in algorithms where such a relationship exists. For example, in the maximisation of Mutual Information image registration method an interpolation step is usually required to estimate the joint PDF. Using the proposed approach, and incorporating the geometric relationship between the two images being registered into the joint PDF calculations, such a step becomes unnecessary. An example of a geometric relationship appropriate for image registration is an Euclidean transformation which can model a uniform scaling, translation and rotation of an image.

Example Results

A number of tests were performed, using synthetic data as the sampled signal. The stability and accuracy of the results of different methods were assessed. Stability was measured as the variation of the PDF under the geometric Euclidean group of transformations, namely translation and rotation. In one dimension, this reduces to a shift. The Total Variation ($L_1$) is used as the distance metric i.e. measure of stability. In the case where the ground-truth PDF is known, for example with the synthetic data used in the tests, the accuracy of the PDF estimate is also assessed. This is done by measuring the distance between the estimate and the ground-truth; again the Total Variation ($L_1$) is used as the distance metric.

Figure 6A:
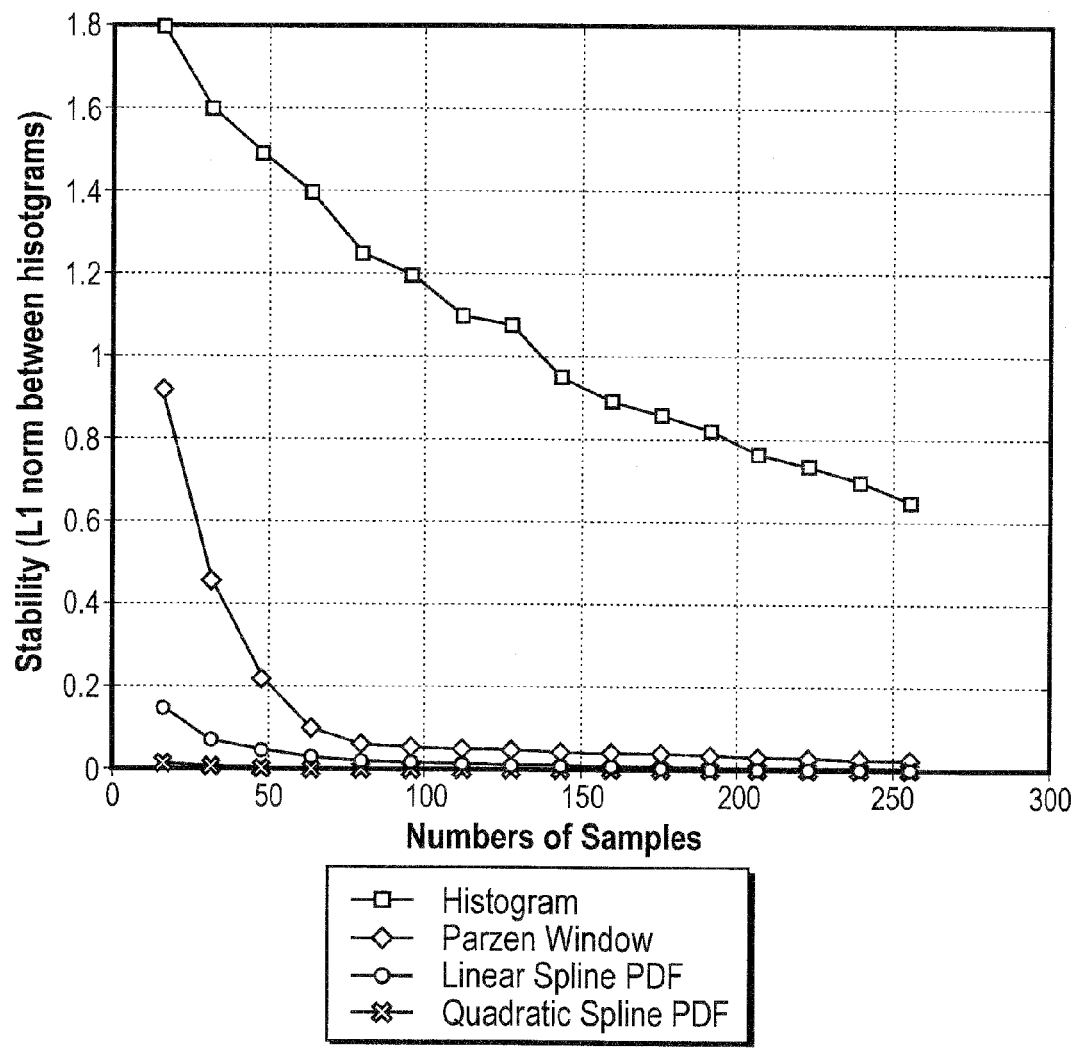
FIG. 6 gives plots of stability and accuracy of the results of PDF estimations of a sine function by different methods, both according to and not according to the invention.
Figure 6B:
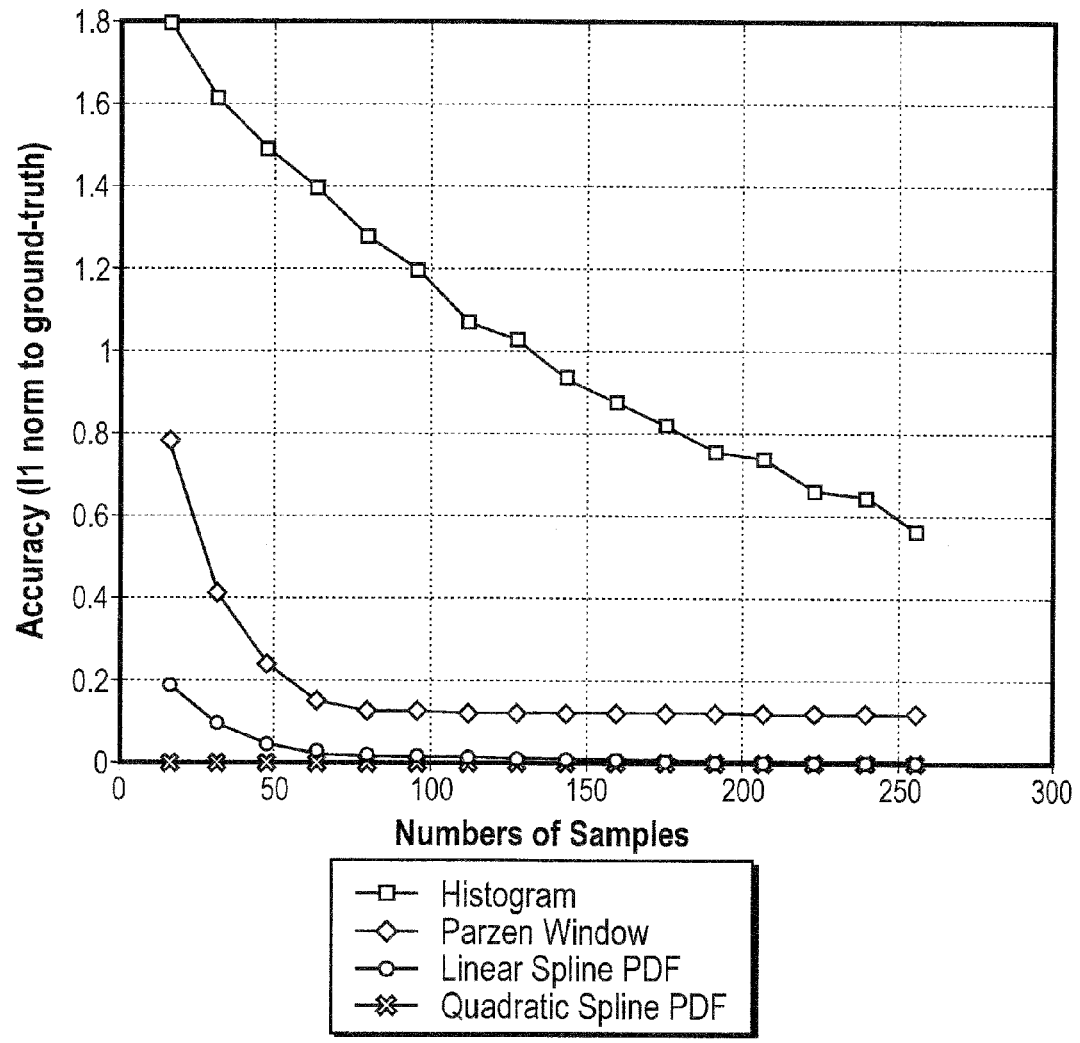
Figure 7A:
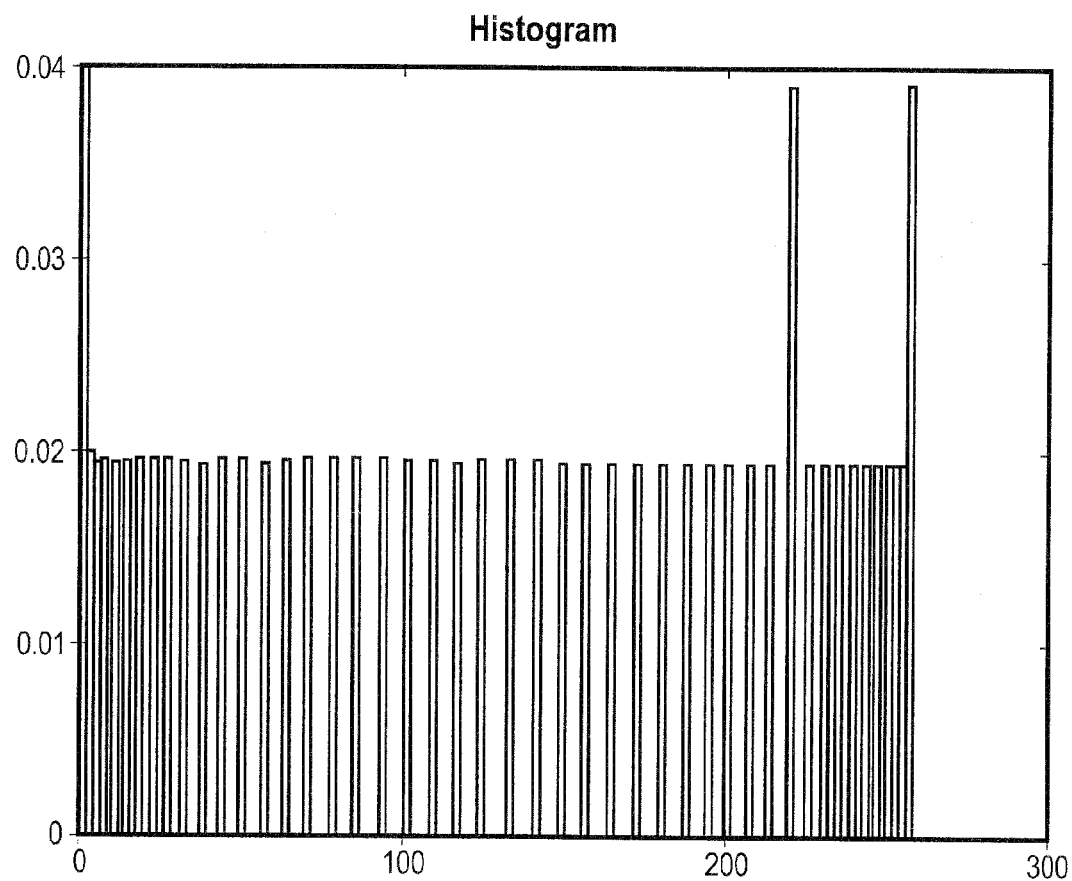
FIG. 7 shows examples of the PDF estimates of the sine function from 50 samples according to four different methods, both according to and not according to the invention.
Figure 7B:
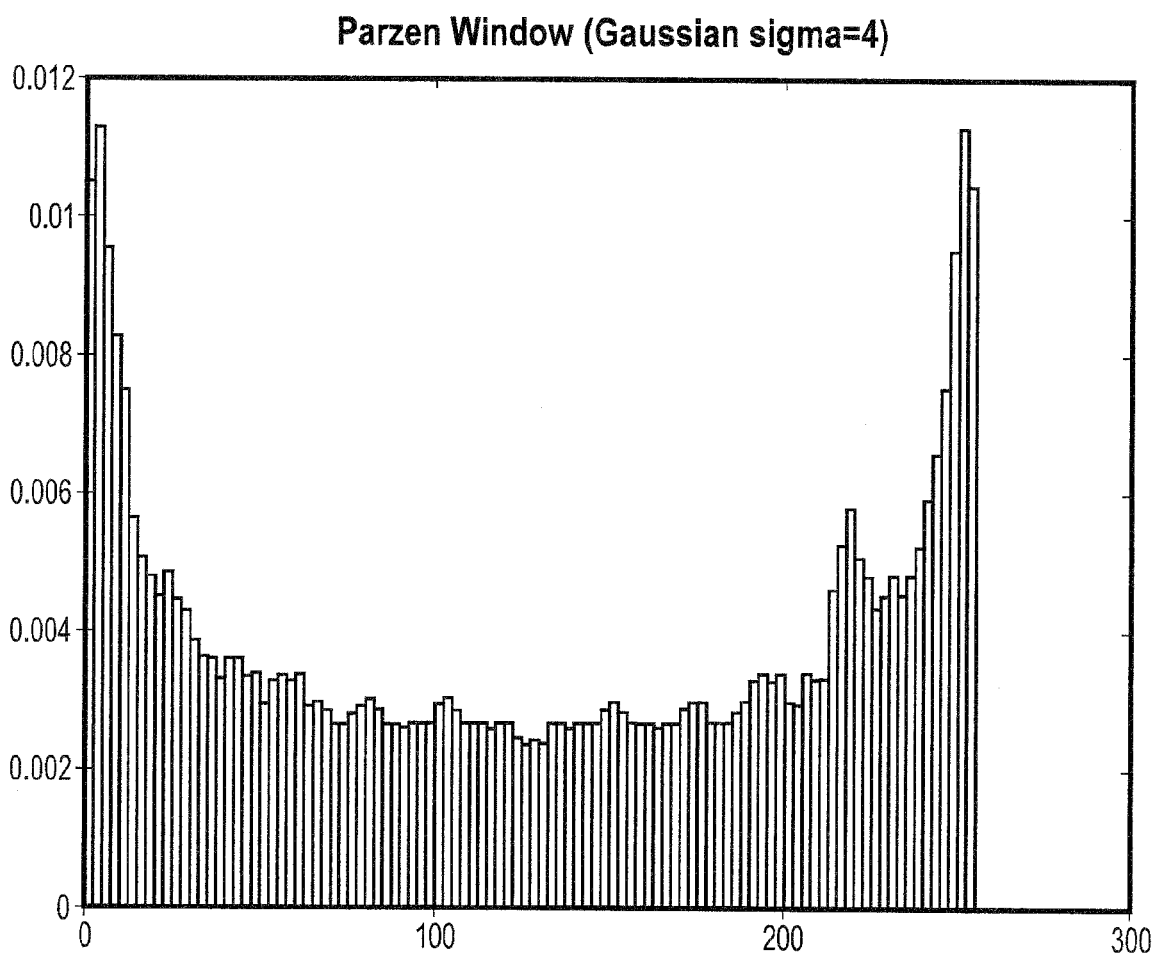
Figure 7C:
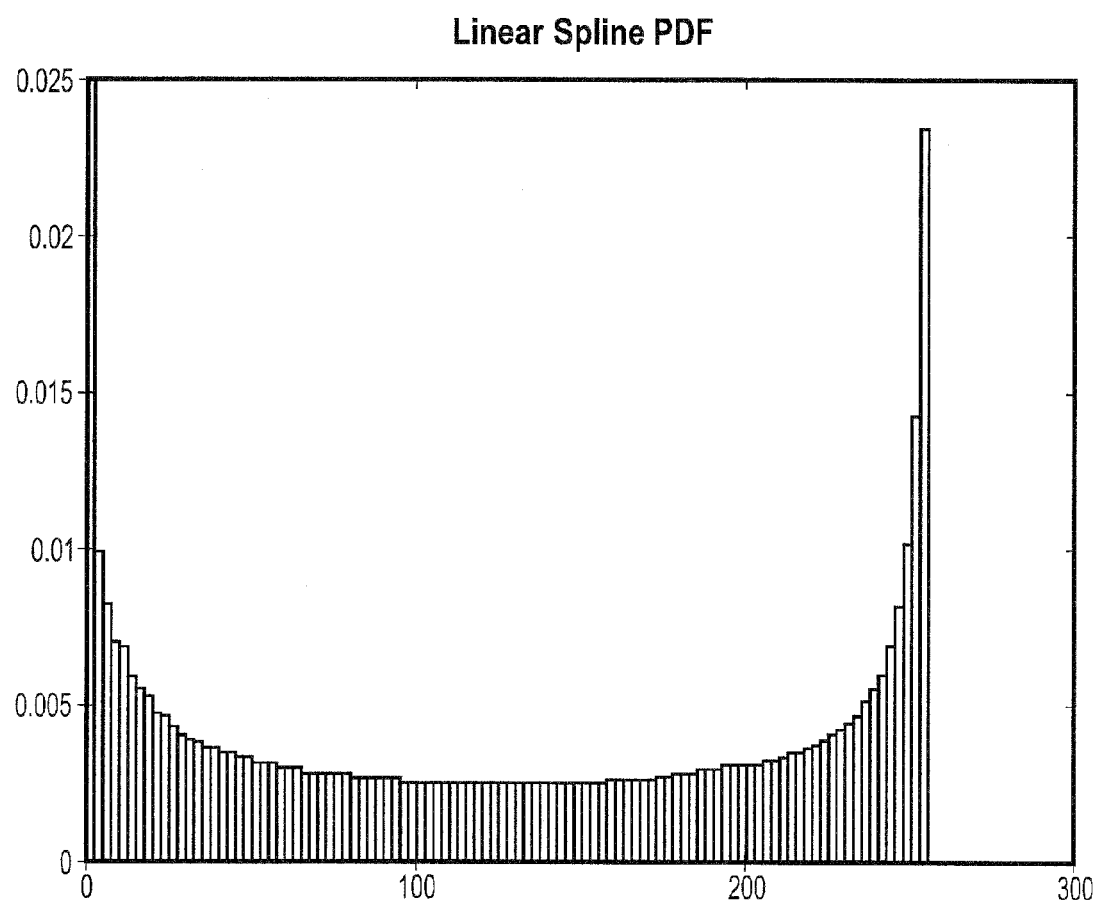
Figure 7D:
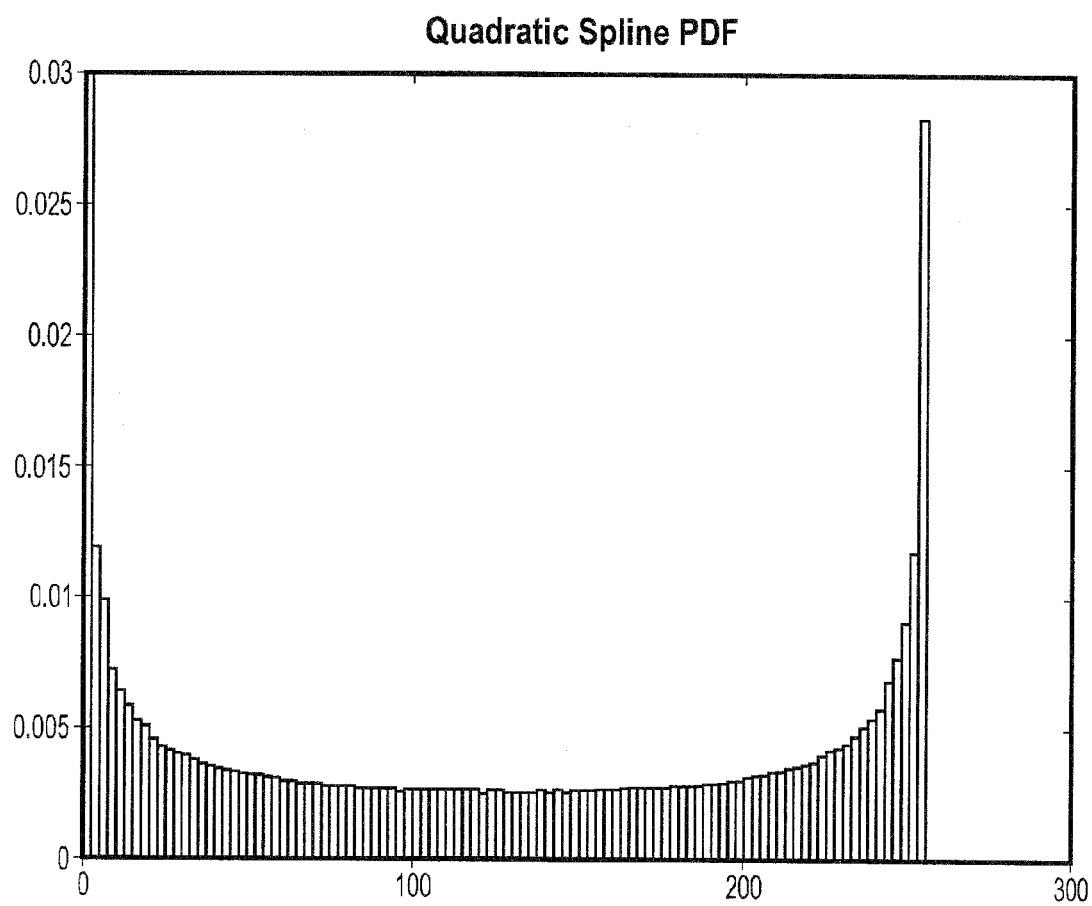

The first test compares the PDF estimate stability and accuracy for four techniques: conventional histogram, Parzen window (Gaussian $\Phi$=4), linear spline (i.e. piecewise polynomial) and quadratic spline (i.e. piecewise polynomial). The objective is to estimate a 256 bin histogram from one period of the sine function, 127.5 sin(x+phi)+127.5, using a predetermined number of samples. FIG. 6 shows the quality results. Clearly, the spline methods outperform the conventional methods by some significant margin, however the Parzen window method performs surprisingly well considering it is just a Gaussian smoothed version of the histogram. The reason for this is that in this particular case smoothing across histogram bins is a good thing to do since in a sine function adjacent locations vary smoothly. In general this is not true. Moreover, whilst the stability converges to zero with increasing sample number the accuracy of the Parzen window methods does not, in contrast to the other methods. This is because Gaussian smoothing causes a distortion in the PDF which cannot be removed despite an increase in the number of samples. This confirms the rule of thumb that the width of the Parzen kernel should be inversely related to the number of samples available.

It should also be said that the sine function also favours the quadratic spline method since a quadratic can approximate a sine quite well with only a few samples.

FIG. 7 shows examples of the PDFs generated by each method with 50 samples.

Further Embodiments

If the spline function exactly replicates the true interpolation of the sampling pre-filter then the resulting PDF is exact. In general however, this is unlikely to be the case and the interpolation will only be an approximation to the true band-limited signal.

One way in which the approximation can be improved is to use higher order polynomials such as cubic splines. However, in practice, increasing the order and/or dimension can quickly lead to unwieldy expressions and in many cases unsolvable integrals. For example, for the 2D quadratic case the final integration is not immediately solvable in closed form and an approximation must be used.

Moreover, since the optimal interpolator is determined by the sampling pre-filter it is unlikely to be available in a suitable analytic form and must be specified numerically. One further approach to improve the accuracy of the interpolation is to up-sample the signal using the optimal interpolator and then use a bilinear or quadratic PDF estimator at this higher sampling rate. Non-uniform spatial sampling can be used to reduce the overhead associated with higher sampling rates; locations at which the signal is complex are sampled more finely.

The PDF calculations described above require that the interpolating function is monotonic, i.e. either strictly increasing or decreasing, between the sample points. For some cases, such as the linear polynomial spline, this is always true. For higher order and higher dimension cases this may not be true. Therefore preferred implementations handle such situations explicitly. For example, an algorithm detects any inflection points, i.e. where the gradient changes sign, and treats each portion between such points independently. However, for speed and simplicity of the implementation, it is advantageous to detect all such inflection points after the interpolating functions have been fitted and treat these as if they were extra sample points. All the PDF calculations are then performed with the guarantee that the interpolating functions are monotonic. In effect, the number of samples and hence the number of polynomial functions are increased.

A way to further optimise the implementation is to detect adjacent interpolating functions, which can be grouped together into one interpolating function which is still monotonic. The aim is to reduce the number of samples and hence the number of interpolating functions that have to be processed. The effect is to change the signal from one that is uniformly sampled to one that is non-uniformly sampled.

Alternatively, original sample positions may be moved to positions that allow a more accurate interpolation of the signal.

From the previous point it can be readily appreciated that the method can be applied equally well to uniformly and non-uniformly sampled data.

The basic algorithm described first fits all of the interpolating functions to the signal samples and then processes each in turn. For each interpolating function the appropriate equations must be used. For example, for the bilinear polynomial spline case it must be determined to which one of the 24 possible configurations the current polynomial corresponds and then process that using the equations specific to that configuration. An alternative to this which may be faster in many situations is to parse the all of the polynomials in the whole signal to detect their configuration or 'type', then create a list for each type indexing the corresponding polynomials and finally process all polynomials from each 'type' consecutively. This is likely to be faster in cases where there are a large number of samples.

The approach outlined uses the exact closed-form solution to the necessary calculations. In some cases, such as higher order polynomial functions or other interpolating functions, the closed-form solutions may not exist or be computationally inconvenient. In such cases, numeric integration or some other form of approximation may be used in the implementation.

As an alternative to using more accurate interpolating functions, such as high order polynomials, it may be faster and computationally more convenient to first up-sample the signal by some small factor, say two or four times, using an accurate form of the interpolating function (which can be derived from the sampling pre-filter) and then apply the proposed technique with a simple interpolating function such as a linear or bi-linear polynomial.

Since sampled signals have also to be discretized in order to be represented in a digital signal processing system, such discretization has the effect of adding noise or uncertainty to the value of the samples. To further improve the accuracy of the technique of the invention this can be taken into account in several ways. One way is to account for the uncertainty in the sample value by using an approximating spline instead of an interpolating spline. An alternative is to blur the final PDF estimate at the points corresponding to the limits of each piecewise polynomial section.

As an alternative to Step 3 where a histogram is populated, one can use the closed-form solution of the distribution directly in many algorithms. For example, in many algorithms that require the estimation of a distribution function, a distance is used to measure the difference between one set of data and another. Such a distance could be designed to work with the closed-form distribution directly. Functions of the distribution can also be calculated in closed-form. For example, the derivative of the distribution can be calculated in closed-form for use in algorithms such as Maximisation of Mutual Information or ICA. One can also use the results of step 2 to fit another probability parametric model such as a Gaussian or mixture of Gaussians.

As an alternative to, or in addition to, calculating the full probability distribution one can calculate other statistics of the signal or signals directly such as its conditional density, mean, variance or other moments of the signal. More generally other functions of the signal statistics can be calculated such as its entropy. The advantage of the method of the invention is that such calculations may be perform in closed-form i.e. analytically and not numerically and hence can be performed more quickly and with more accuracy.

Many signal processing techniques require the estimation of the probability distribution over different parts of a signal where such parts could be overlapping. For example, in an image processing application such as the detection and recognition of human faces it might be required that the probability distributions of areas corresponding to the eyes, mouth, nose and whole face be estimated from an image. Another example of such a technique requires the calculation of the probability distribution of an image inside 'windows' of varying size at all spatial positions in the image. Previous implementations of this technique attempt to do this using a histogram, however the method of the invention offers significant advantages in terms of stability and accuracy of the resultant selected image regions. In such cases where the probability distribution must be calculated over overlapping parts of a signal or image, it can be more efficient to modify the method embodying the invention in the following way:

perform Step 1 and Step 2 as before, then apply Step 3 multiple times within the specific regions of interest required. Avoiding the repetition of steps 1 and 2 by using their results in a repeated fashion gives rise to a computational complexity similar to that of histogramming.

There is an alternative, and in theory equivalent, formulation of the invention to that described. Here the signal is considered from the co-domain first which is divided into ranges (or bins) and then the aim is to measure the fraction of the domain that the signal goes between each range. Calculations similar those outlined in the embodiments of the invention are performed because the signal will need to be interpolated. In the case of an image this approach has an intuitive interpretation. First the image is considered as a height map, i.e. where brightness is treated as the height of a surface. Then level lines or isocontours are found on this surface. As on a geographical map, such level lines depict locations of equal height (or intensity in the case of the image). The fraction of the total image area that is in between each consecutive pair of level lines corresponds to the probability of the image being between the two corresponding intensity values. If the level lines are calculated at a sub-pixel scale using an accurate interpolation function then the result is an accurate estimate of the probability. This formulation does have the disadvantage of requiring that the division of the co-domain into ranges or bins must be specified before the estimation of the PDF is performed and is consequently fixed at the outset. In the original formulation of the invention the resolution of the final probability distribution is not decided until the last step and can be left in continuous form if required.

The method described so far has considered scalar sampled functions, that is, each sample location depicts a single scalar value such as the pixel brightness in the case of an image. Alternatively, vector sampled functions could be considered where each sample corresponds to a vector value. For example, a RGB colour image where each pixel has three values for each of the red, green and blue channels respectively. In such a case the interpolating function must be fitted in a suitable manner for the signal under consideration. For example, an RGB image could be processed by treating each colour channel independently or first transformed into another colour space such as YUV and the interpolating function fitted in that space. [$Y=aR+bG+cB$; $U=d(B-Y)$; and $V=e(R-Y)$, where a, b, c, d and e are weighting factors].

Although the described method results in accurate and in some cases exact calculation of sampled signal statistics and is primarily intended for application to such signals, it may be advantageous to apply it to signals that have not been formed in the manner described, that is band-limited, sampled in order and quantised. In such cases, the resulting PDF will only be approximate but could still be better than conventional methods such as histogramming or Parzen window estimation. In contrast to Parzen window estimation where the smoothing is performed in the co-domain, i.e. the data values are smoothed, the proposed method smoothes in the domain space, e.g. spatially in the case of images. However, for most accurate results, the signal should be band-limited, and the samples should be ordered, e.g. a time sequence for an audio signal, a spatial array for an image, and so on.

Applications

PDF estimation (and other statistical characterization of a signal) is required for a large number of applications in, for example, machine learning, image signal processing and communications systems. Below are three example applications of the invention.

Figure 8:
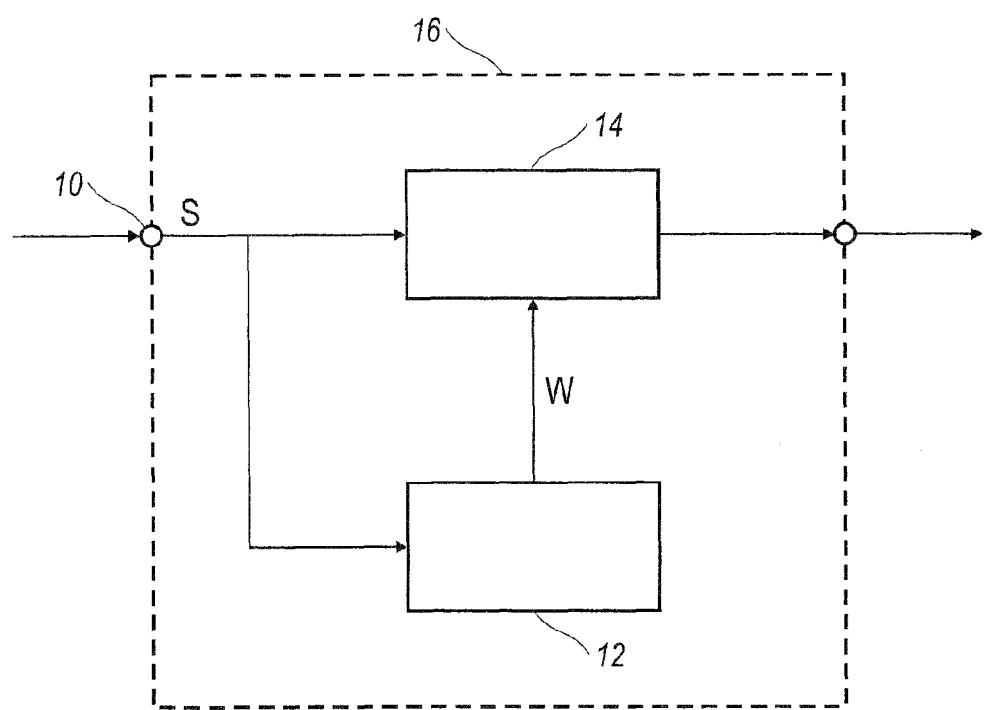
FIG. 8 depicts a signal processing apparatus embodying the invention.

In medical imaging it is often necessary to superimpose one image onto another taken using different modalities such as MM (magnetic resonance imaging) and CT (computed/computerized tomography). However, to do so an algorithm is required to estimate the geometric transformation to map one image onto the correct position on the other. One such algorithm is called Maximisation of Mutual Information and relies heavily on the accurate calculation of marginal and joint PDFs between the images. Currently, implementations typically use histograms for this purpose and consequently perform poorly. The invention can improve the performance of such algorithms significantly. Referring to FIG. 8, an input 10 receives a signal S, in sampled form, representing the images. An analysis module 12 applies the techniques described above to obtain statistical information W on the signal S, namely the marginal and joint PDFs between the images. The statistical information W is passed to a processing module 14 which also receives the original signal S. The processing module 14 applies signal processing to the original signal S, using the statistical information W and the Maximisation of Mutual Information algorithm, to produce an output O comprising one image geometrically transformed to map onto the other image.

Another application is in image retrieval where the aim is to retrieve images from a database that are visually similar to a query image. Colour histograms are a simple and effective technique and are widely used. The invention can be used here to improve the reliability and accuracy of such systems. Again, with reference to FIG. 8, the query image is input together with a database of images as signal S; the analysis module 12 computes colour histograms as the statistical information W; and the processing module 14 uses the information W in conjunction with the database of images (about which statistical information may already been computed and stored) to retrieve potentially similar or matching images from the database as the output O.

Image tracking algorithms rely on accurate PDF estimation to predict the next position and state of targets. For example, one might be interested in tracking a hand or the full body of a human. Typically, such systems assume very simple probability models such as a Gaussian. Alternatively, computationally expensive approaches such as particle trackers can be used. The invention can be used to produce improved trackers since the PDF estimate is accurate, robust and fast to compute. Referring to FIG. 8, a sequence of images is input as input signal S; the analysis module 12 calculates PDF estimates as the statistical information W; and the processing module 14 performs signal processing on the original signal S, using the PDF information W, to predict the next position and state of a target in the image as the output O.

The invention can be embodied in dedicated hardware or in software. For example, the invention can be embodied by a computer program executed on a computer system 16. The computer system 16 may be any type of computer system, but is typically a conventional personal computer executing a computer program written in any suitable language. The computer program may be stored on a computer-readable medium, which may be of any type, for example: a recording medium, such as a disc-shaped medium insertable into a drive of the computer system, and which may store information magnetically, optically or magneto-optically; a fixed recording medium of the computer system such as a hard drive; or a solid-state computer memory (fixed or removable). The signal to be analysed may be input into the computer system directly, for example from a microphone or camera apparatus, or the computer system may read information representing the signal from a store of previously obtained signals. The computer system may also be embodied as dedicated hardware, for example in a custom integrated circuit in a mobile telecommunication device for speech processing.

The invention claimed is:

1. A signal processing method comprising:
   inputting sample values, into a hardware memory of a computer, of a band-limited signal;
   considering the signal to comprise a plurality of portions;
   wherein the signal processing method is characterised for each portion of the signal by:
   a) fitting a predetermined interpolating or approximating function to the sample values of the portion of the signal, by calculating values of coefficients for the predetermined interpolating or approximating function, the interpolating or approximating function approximating a reconstruction of the portion of the signal; and
   b) evaluating a statistical information function using the calculated coefficient values, to determine statistical information sought for the portion of the signal, wherein the statistical information function is an analytic solution for:
   (i) the statistical information; and
   (ii) the predetermined interpolating or approximating function;
   using the statistical information obtained about the signal to process the signal.

2. The method according to claim 1, wherein the statistical information is information about the probability distribution of the signal.

3. The method according to claim 1, wherein the statistical information about the signal comprises one or more selected from the group consisting of the probability density function, the cumulative distribution function, the conditional density, the mean, the variance, other moments and the entropy.

4. The method according to claim 3, further comprising:
   cumulatively populating the appropriate bins of a histogram, by evaluating the probability density function or cumulative distribution function for each portion of the signal.

5. The method according to claim 1, wherein the portions of the signal for processing according to the method comprise the portions between consecutive samples.

6. The method according to claim 1, further comprising interpolating additional sample values from the input sample values for at least a region of the signal, and using the additional values in the fitting and evaluating steps.

7. The method according to claim 1, wherein the predetermined interpolating function is a polynomial.

8. The method according to claim 1, wherein the predetermined interpolating function is one selected from the group consisting of a 1D linear function, a 1D quadratic function, a 2D bilinear function, a cubic spline and a sinc-based function.

9. The method according to claim 8, wherein for a one dimensional interpolating function:
   (i) the statistical information function is:

$$F_y(y) = \frac{y}{|a|} \quad b \le y \le a+b$$

when the predetermined interpolating function is the one dimensional interpolating function y=ax+b, and the desired statistical information is the CDF; or
   (ii) the statistical information function is:

$$f_y(y) = \frac{1}{|2ax_1 + b|} f_x(x_r)$$

when the predetermined interpolating function is the one dimensional interpolating function y=ax$^2$+bx+c, and the desired statistical information is the PDF.

10. The method according to claim 1, wherein the signal is one of a speech signal, a still image signal or a video signal.

11. The method according to claim 1, further comprising:
    inputting the sample values of a second sampled signal, and wherein the evaluating step comprises evaluating the joint probability density function between the two sampled signals.

12. The method according to claim 11, wherein:
    the sampled signals are medical images taken using different modalities, for example, an MRI (magnetic resonance imaging) scan and a CT (computed/computerized tomography) scan;
    the statistical information is the marginal and joint probability density functions (PDFs) between the images; and
    the signal processing further comprises transforming one image geometrically to map that image onto the other image.

13. The method according to claim 1, wherein:
    the signal samples are ordered and/or the signal has been sampled non-uniformly.

14. A non-transitory computer-readable medium storing a computer program comprising computer-executable code that, when executed on a hardware computer system including a memory and an integrated circuit, causes the computer system to perform a signal processing method according to claim 1.

15. A signal processing apparatus comprising:
    an input module, on a hardware computer system, that receives sample values of a band-limited signal;
    an analysis module, on the hardware computer system, for considering portions of the signal;
    wherein the signal processing apparatus is characterised in that, for each portion of the signal, the analysis module is adapted to:
    a) calculate values of coefficients for fitting a predetermined interpolating or approximating function to the sample values of that portion of the signal, the interpolating or approximating function approximating a reconstruction of the portion of the signal; and
    b) evaluate a statistical information function using the calculated coefficient values, to determine statistical information sought for the portion of the signal, wherein the statistical information function is an analytic solution for:
    (i) the statistical information; and
    (ii) the predetermined interpolating or approximating function;
    further comprising a processing module that uses the statistical information obtained about the signal by the analysis module to process the signal.

* * * * *